No. 622,745. Patented Apr. 11, 1899.
H. WITTBOLD.
HOT WATER HEATING APPARATUS.
(Application filed Nov. 18, 1895. Renewed June 18, 1898.)
(No Model.) 3 Sheets—Sheet 1.
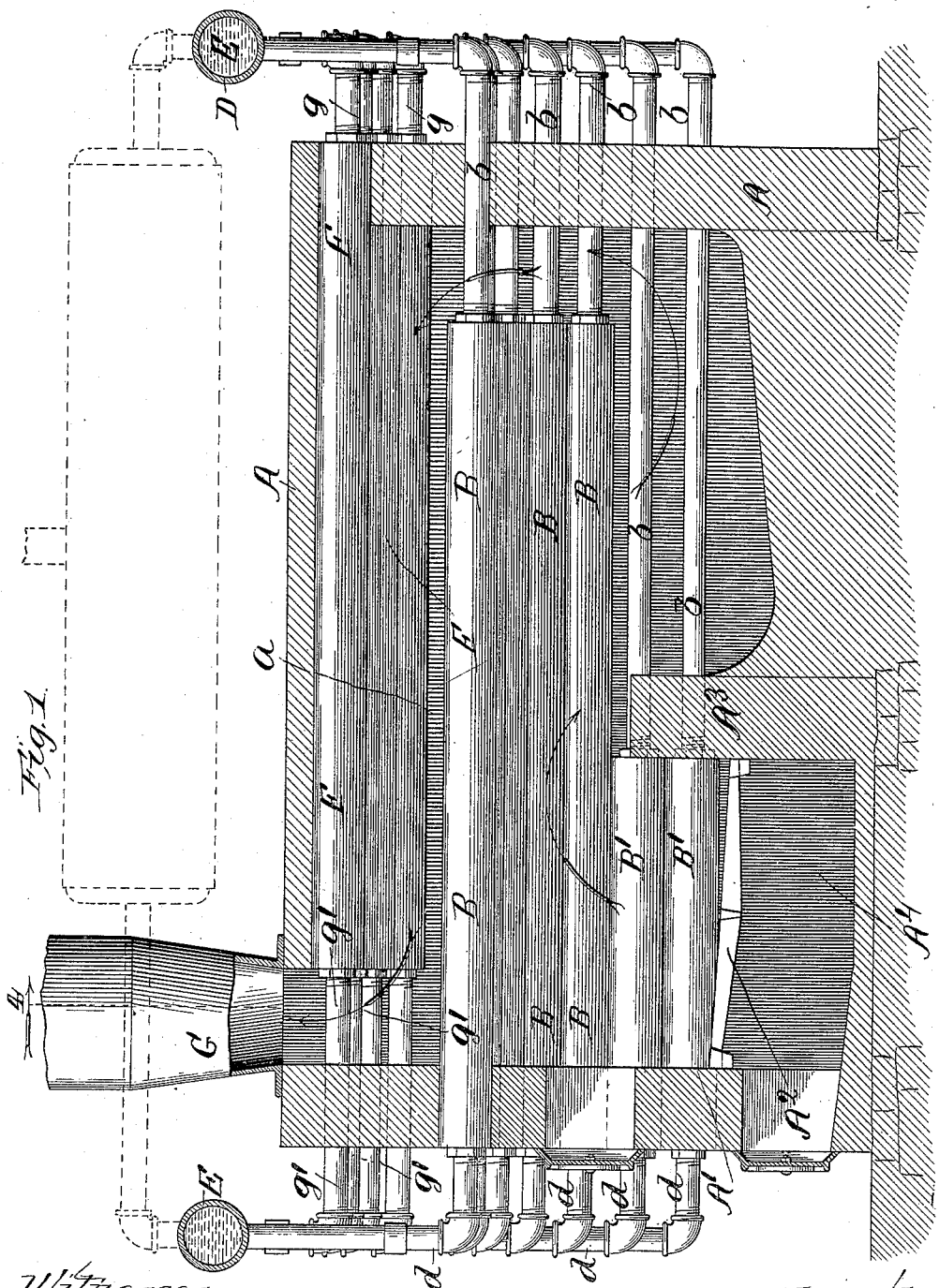

No. 622,745. Patented Apr. 11, 1899.
H. WITTBOLD.
HOT WATER HEATING APPARATUS.
(Application filed Nov. 18, 1895. Renewed June 18, 1898.)
(No Model.) 3 Sheets—Sheet 2.
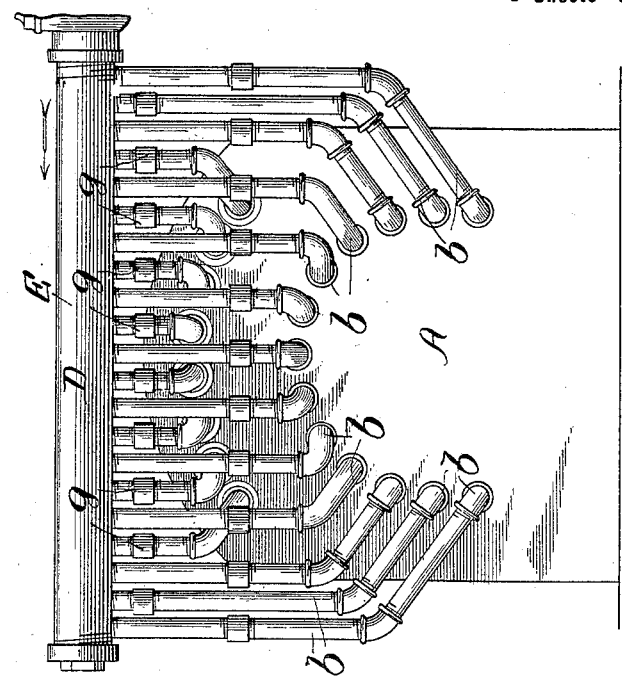
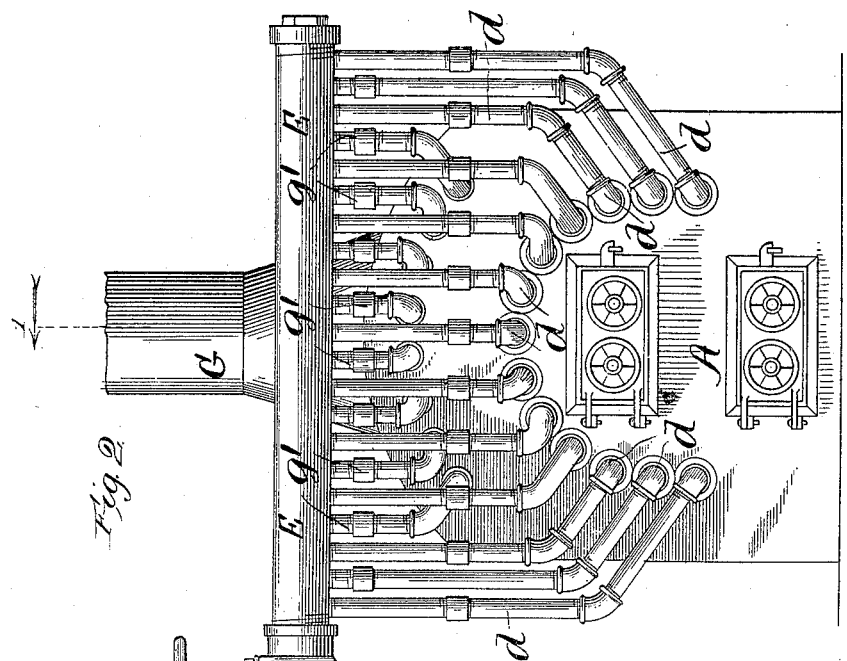
Witnesses:
Inventor:
Henry Wittbold.
By L. B. Coupland &Co
Attys.

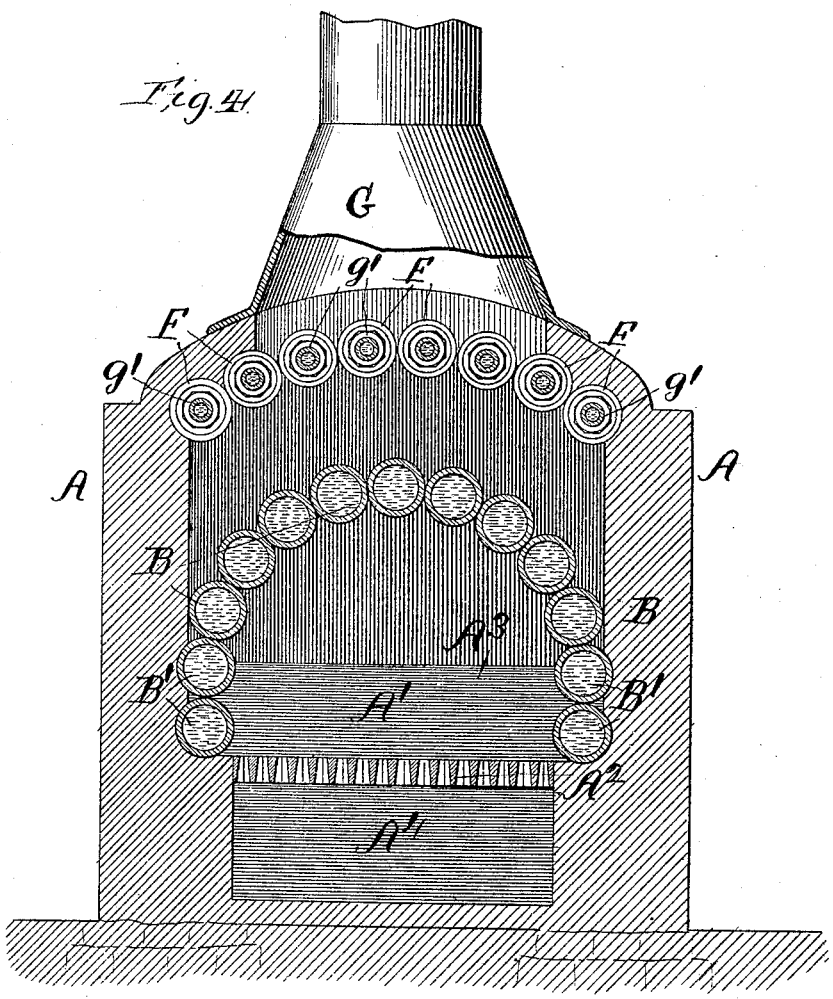

UNITED STATES PATENT OFFICE.

HENRY WITTBOLD, OF CHICAGO, ILLINOIS.

HOT-WATER HEATING APPARATUS.

SPECIFICATION forming part of Letters Patent No. 622,745, dated April 11, 1899.

Application filed November 18, 1895. Renewed June 18, 1898. Serial No. 683,864. (No model.)

*To all whom it may concern:*

Be it known that I, HENRY WITTBOLD, a citizen of the United States, residing at Chicago, in the county of Cook and State of Illinois, have invented certain new and useful Improvements in Hot-Water Heating Apparatus; and I do hereby declare the following to be a full, clear, and exact description of the invention, such as will enable others skilled in the art to which it appertains to make and use the same.

This invention relates to a hot-water heating system that is more especially intended for greenhouse service, and has for its object to provide an arrangement of this character that will insure a continuous circulation of the heating agent and maintain a uniform temperature.

A further object is to provide an apparatus that may be repaired with facility and be economical in the consumption of fuel.

In operating a greenhouse it is necessary that the heating apparatus be of such a character that repairs can be made without having to shut off the entire heating circulation but momentarily. Otherwise great damage and loss will be incurred.

In the drawings, Figure 1 is a longitudinal section and part elevation of an apparatus embodying the improved features; Fig 2, a front elevation; Fig. 3, a rear elevation; and Fig. 4, a vertical transverse section on line 4, Fig. 1.

A represents the usual inclosing walls or masonry; A', the combustion-chamber; A², the grate-bars; A³, the bridge-wall, and A⁴ the ash-pit.

The heating apparatus proper is in the form of a sectional pipe-boiler and is grouped in two series—lower and upper—with a heat passage or space $a$ therebetween, as shown more clearly in Fig. 4, so as to provide for a large amount of heating-surface within a limited space.

The lower series of water holding and heating tubes B are arranged in the form of an arch and in contact with each other. Each particular tube is independent of the other and may be stopped off or removed in case of a leak or other reasons necessitating repairs, without disarranging the companion tubes or drawing off the water therefrom.

The two lower pipes B' of the series B abut against the bridge-wall and inclose each side of the combustion-chamber on a line with the grate-bars, so as to present all the heating-surface possible and utilize the greater part of the heat generated. The tubes B extend back of the bridge-wall and stop short of the inclosing rear end wall. A series of water-conducting pipes $b$, of a less diameter, connect with the rear ends of tubes B and B', extend out through the inclosing end wall, and then turn upwardly and terminate in the return end or part D of the main circulating-pipe E.

Reducing the diameter of the water-tubes at the rear end provides for the free passage of the products of combustion, as indicated by the arrows. The front ends of the tubes B extend through the front wall, stopping flush with the face thereof. The lower ends of a series of small pipes $d$ are inserted in the front ends of tubes B and extending upwardly therefrom connect with and open into the delivery end of the main circulating-pipe E. This pipe is shown broken away but a continuation of it will extend throughout the space to be heated, the part D being the return end of the same.

The upper series of water-heating tubes F are arranged side by side in the form of an arch, the rear ends extending through the end wall, where the lower ends of a series of smaller pipes $g$ connect therewith, the pipes $g$ passing upwardly and being inserted in the return end D of the main circulating-pipe E. The front ends of tubes F stop short of the front inclosing wall and connect with the series of smaller pipes $g'$, which pass out through the front wall and then turn upwardly and open into the main circulating-pipe E. The tubes F stopping short of the fire front or wall and then connecting with the tubes of a less diameter provides for the escape of heat gases into the smoke-stack G. This arrangement provides a heating apparatus wherein each water-tube is independent of the other and may be readily removed and replaced without interfering with the companion tubes when it is necessary to make repairs. The pipe circulating system will be controlled by suitable valves arranged at different points and the water supplied in the usual manner.

The arched arrangement of the water-tubes presents a large amount of heating-surface within a compact space, so as to get the best results from a small expenditure of fuel, and the apparatus may be easily and quickly constructed at a reasonable cost, and thus bring it within the reach of the smaller as well as the larger greenhouses.

In operation the heated volume of water will pass into the main circulating-pipe at the front and will return through the rear end, as indicated by the arrows.

Steam may be generated from this apparatus and a reservoir provided therefor, as indicated by dotted lines in Fig. 1.

Having thus described my invention, what I claim as new, and desire to secure by Letters Patent, is—

1. In a hot-water heating apparatus, the combination with a series of water-tubes, stopping short of the rear inclosing wall, of a series of water-conducting pipes, of a less diameter and inserted in the respective ends of the companion series of water-tubes, both front and rear, and the main circulating-pipe, with which the outer ends of the series of conducting-pipes connect, substantially as and for the purpose set forth.

2. In a hot-water heating apparatus, the combination with a series of water-tubes, each arranged independently of the other and stopping short of the rear inclosing wall, a series of pipes, of a less diameter connecting the respective ends of said water-tubes with the delivery and return ends of the main circulating-pipe, a second series of water-tubes arranged above the first series with a space therebetween and stopping short of the front inclosing wall, a series of pipes, of a less diameter inserted in the respective ends of the second series of water-tubes, and a main circulating-pipe, with which the latter series of pipes also connect, substantially as and for the purpose set forth.

In testimony whereof I affix my signature in presence of two witnesses.

HENRY WITTBOLD.

Witnesses:
 L. M. FREEMAN,
 L. B. COUPLAND.